US008346082B2

United States Patent
Yoon et al.

(10) Patent No.: US 8,346,082 B2
(45) Date of Patent: Jan. 1, 2013

(54) METHOD OF SAVING POWER IN OPTICAL ACCESS NETWORK

(75) Inventors: Bin-Yeong Yoon, Daejeon (KR); Sung-Chang Kim, Gwangjoo (KR); Geun-Yong Kim, Goyang (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 400 days.

(21) Appl. No.: 12/678,742

(22) PCT Filed: May 22, 2008

(86) PCT No.: PCT/KR2008/002855
§ 371 (c)(1),
(2), (4) Date: Mar. 17, 2010

(87) PCT Pub. No.: WO2009/054581
PCT Pub. Date: Apr. 30, 2009

(65) Prior Publication Data
US 2010/0260497 A1    Oct. 14, 2010

(30) Foreign Application Priority Data
Oct. 23, 2007    (KR) .................... 10-2007-0106735

(51) Int. Cl.
*H04B 10/00*    (2006.01)
(52) U.S. Cl. .............................. 398/72; 398/113; 398/94
(58) Field of Classification Search ............... 398/66–72, 398/113, 94
See application file for complete search history.

(56) References Cited

U.S. PATENT DOCUMENTS

| 5,297,144 | A  | * | 3/1994  | Gilbert et al. ............... 370/346 |
| 5,504,606 | A  | * | 4/1996  | Frigo ................................ 398/58 |
| 7,287,175 | B2 | * | 10/2007 | Vereen et al. ................. 713/323 |
| 7,389,528 | B1 | * | 6/2008  | Beser ............................. 725/111 |
| 7,545,813 | B2 | * | 6/2009  | Davis et al. ................. 370/395.4 |
| 7,751,711 | B2 | * | 7/2010  | Wynman .......................... 398/72 |
| 8,139,937 | B2 | * | 3/2012  | Kim et al. ........................ 398/38 |
| 2005/0047782 | A1 | * | 3/2005  | Davis et al. .................... 398/58 |
| 2005/0158048 | A1 | * | 7/2005  | Sung et al. ...................... 398/66 |
| 2006/0029389 | A1 | * | 2/2006  | Cleary et al. ................... 398/33 |
| 2006/0053309 | A1 | * | 3/2006  | Vereen et al. ................. 713/300 |
| 2007/0140691 | A1 |   | 6/2007  | Gao et al. |
| 2007/0142098 | A1 | * | 6/2007  | Behzad et al. ................ 455/574 |
| 2008/0025721 | A1 | * | 1/2008  | Wynman .......................... 398/38 |
| 2008/0195881 | A1 | * | 8/2008  | Bernard et al. .............. 713/340 |
| 2008/0232290 | A1 | * | 9/2008  | Elzur et al. .................... 370/311 |
| 2009/0016713 | A1 | * | 1/2009  | Liu et al. ......................... 398/17 |
| 2010/0278527 | A1 | * | 11/2010 | Wynman ............................ 398/9 |
| 2012/0027411 | A1 | * | 2/2012  | Gao et al. ........................ 398/66 |

FOREIGN PATENT DOCUMENTS
JP    2007-089027 A    4/2007
KR    10-0547881 A     2/2006

* cited by examiner

*Primary Examiner* — Agustin Bello

(57) ABSTRACT

According to a method of reducing power in an optical access network, upon the application of power, an optical network terminal (ONT) operates normally in an activation mode. The ONT then determines whether the requirements for switching from activation mode to power-saving mode are satisfied. If the requirements are satisfied, the ONT transmits a sleep signal to an optical line terminal (OLT), which is a message notifying that the ONT will soon switch to power-saving mode. Thereafter, the ONT switches to power-saving mode and cuts off power for all functions except for power for monitoring and controlling external inputs. The ONT then determines whether the requirements for switching from power-saving mode to activation mode are satisfied. If the requirements are satisfied, the ONT transmits a wake-up signal to the OLT and switches to the activation mode for normal operation.

4 Claims, 4 Drawing Sheets

METHOD OF SAVING POWER IN OPTICAL ACCESS NETWORK

TECHNICAL FIELD

The present invention relates to a method of saving power in an optical access network (OAN) that has gained increasing popularity for home and office use, and more particularly, to a method of saving power for an optical network terminal (ONT) and an optical line terminal (OLT) in an OAN, such that the method can be simply realized with software to thus not require any additional hardware devices.

BACKGROUND ART

An optical network involves technology to effectively provide a bandwidth needed by a subscriber terminal and can be either point-to-point or point-to-multipoint architecture. In an optical network, an optical line terminal (OLT) has an interface for supporting multiple optical network terminals (ONTs) and exercises control over all ONTs in the optical network. While active optical networks (AONs) generally utilize a point-to-point architecture, passive optical networks (PONs) are configured as a point-to-multipoint network, and PONs and AONs are being standardized by international organizations such as the IEEE and the ITU-T.

As communication network systems become more common at work and home, more attention is being paid to efficient power consumption. For example, OLTs and ONTs in an optical access network (OAN) tend to be on all day. However, given the fact that users actually use ONTs for about 5 hours each day (20% of the day), a significant amount of unnecessary power may be expended. Furthermore, despite its high utilization, OLTs consume a much greater amount of electrical power than ONTs in regards to managing multiple ONTs.

According to a conventional approach of minimizing power consumption of an OAN, an ONT operates with a backup battery during an emergency, i.e., when the main power supply is no longer available. However, this approach has proposed only as a technique to extend the life of ONTs during a power outage by reducing the power consumption of the ONTs as much as possible. Unfortunately, there have been no approaches of minimizing power consumption of an ONT during its normal operation and of an OLT during both its normal and emergency operations.

DISCLOSURE OF INVENTION

Technical Problem

As described above, the proposed approaches for saving power consumption of an OAN involve reducing the power consumption of an ONT during an emergency once an emergency battery is used due to a main power failure. However, since an ONT system is kept on all day, it may be of great importance to develop a method of saving power of the system during its normal operation. Given that an ONT is actually used at home within less than 10 hours, to sustain data, broadcast, and voice services, there may be a great amount of unnecessary power being dissipated during the rest of the hours in the day. Aside from an ONT, there is a more urgent need to develop a method of reducing power consumption of an OLT with components requiring high power consumption such as high-output lasers and high-performance switches.

Technical Solution

The present invention provides a method of reducing power consumption on an optical access network (OAN) as much as possible by configuring an optical line terminal (OLT) and optical network terminals (ONTs) in the OAN to support a maximum power-saving mode.

Advantageous Effects

The increasing use of communication network systems at homes and offices is increasing the need for efficient power consumption. For example, an OLT and ONTs in a passive optical access network tend to be on all day. However, since it is estimated that users actually use ONTs for about 5 hours (20% of the day) each day, a significant amount of unnecessary power may be expended. Furthermore, despite its high utilization as a master that manages multiple ONTs, the OLT consumes a much greater amount of electrical power than an ONT because the OLT has a high-output optical transmitter/receiver and high-performance devices.

A method of reducing power consumption for OLT and ONTs in an OAN according to the present invention can be easily realized with software and thus not by using separate physical units or apparatuses. The present invention can also reduce power consumption of a subscriber (ONT) as well as operation and maintenance costs that will be paid by a network operator (OLT). Furthermore, when time-of-use pricing is applied to a current flat-rate and a meter-rate billing system, a technique to reduce power consumption for an ONT as proposed by the present invention can efficiently reduce the total energy consumption across the country while minimizing communication fees.

DESCRIPTION OF DRAWINGS

The above and other features and advantages of the present invention will become more apparent by describing in detail exemplary embodiments thereof with reference to the attached drawings in which.

BEST MODE

Figure 1:
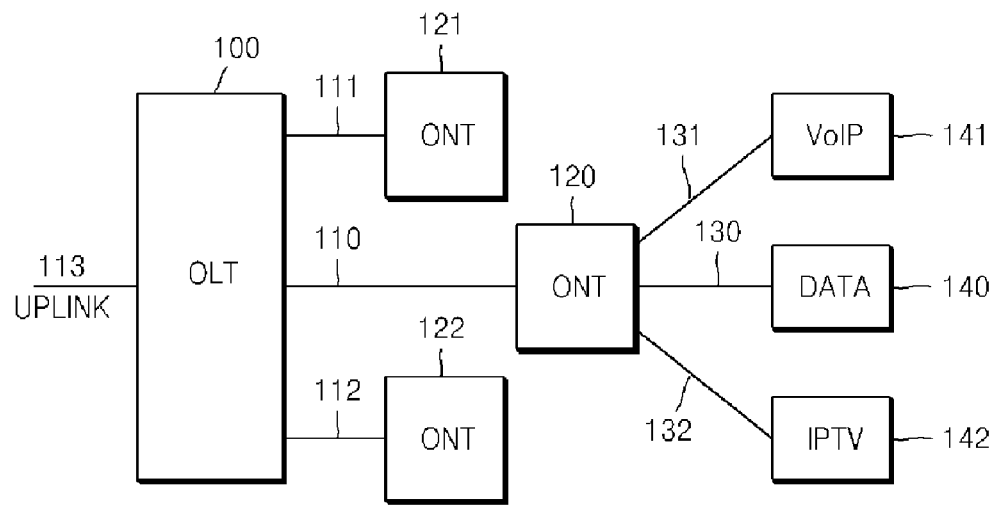
FIG. 1 illustrates a configuration of an optical access network (OAN) to which the present invention can be applied, the OAN comprising an optical line terminal (OLT) and a plurality of optical network terminals (ONTs) having interfaces respectively connected to different subscriber devices, according to an embodiment of the present invention.

According to an aspect of the present invention, there is provided a method of reducing power consumption for an ONT in an OAN, including: applying power so that the ONT operates normally in an activation mode; determining whether requirements needed for the ONT to switch from the activation mode to power-saving mode are satisfied; transmitting, if the requirements for switching from the activation mode to the power-saving mode are satisfied, a sleep signal that is a message notifying that the ONT will soon switch to the power-saving mode from the ONT to an OLT; switching the ONT to the power-saving mode and cutting off power for all functions except for power for monitoring and controlling an external input; determining whether requirements needed for the ONT to switch from the power-saving mode to the activation mode are satisfied; and transmitting, if the requirements for switching from the power-saving mode to the activation mode are satisfied, a wake-up signal from the ONT to the OLT and switching the ONT to the activation mode for normal operation.

According to another aspect of the present invention, there is provided a method for reducing power consumption for an OLT in an OAN, including: applying power so that the OLT operates normally in an activation mode; determining whether requirements needed for the OLT to switch from the activation mode to power-saving mode are satisfied; switching, if the requirements for switching from the activation mode to the power-saving mode are satisfied, the OLT to the power-saving mode and turning off power for all functions except for power for monitoring and controlling upstream and downstream interfaces; determining whether requirements needed for the OLT to switch from the power-saving mode to the activation mode are satisfied; and applying, if the requirements for switching from the power-saving mode to the activation mode are satisfied, the power from the OLT so that it operates normally in the activation mode.

MODE FOR INVENTION

The present invention will now be described more fully with reference to the accompanying drawings, in which exemplary embodiments of the invention are shown. In particular, the present invention proposes a method for reducing power consumption for an optical line terminal (OLT) system, which allows a network service provider possessing a large number of OLT systems to save network operating costs.

The present invention presents a method of reducing power consumption so as to enable OLT and optical network terminal (ONT) systems to consume a minimum amount of power. In the present invention, an OLT and ONT operate in two modes: activation mode for normal operation and power-saving mode for maximum power-saving operation. According to the method of the present embodiment, the operating mode of an ONT is determined depending on the characteristics of different user terminals connected to the ONT, and the current state of an OLT. It is also assumed that an ONT is connected to three user terminals respectively supporting Voice over Internet Protocol (VoIP), IPTV, and data services in order to provide triple play services (voice, data, and video).

If the requirements for transition to a power-saving mode for the ONT/OLT are satisfied while the ONT/OLT operates in an activation mode, the ONT/OLT switches from activation mode to power-saving mode. When switching to the power-saving mode, the ONT/OLT cuts off the power for all their functions except for the power for monitoring and controlling upstream/downstream interfaces that the ONT/OLT can support, in order to minimize power consumption.

The present invention will be described with respect to an optical network having an optical access network (OAN) architecture. A method of reducing power consumption of the OAN according to an embodiment of the present invention is performed by controllers of the OLT and ONT systems. As described above, each system operates in two modes: activation mode for normal operation and power-saving mode for power-saving operation.

FIG. 1 is a diagram illustrating a configuration of an OAN, according to an embodiment of the present invention. Referring to FIG. 1, an OLT system (hereinafter referred to as an 'OLT') 100 manages a plurality of ONT systems (hereinafter referred to as 'ONTs') 120 through 122. Each of the ONTs 120 through 122 has interfaces 130 through 132 that are respectively connected to a plurality of user terminals 140 through 142, i.e., as shown in the present embodiment and for convenience of explanation, hereinafter respectively referred to as, a data communication terminal 140, a VoIP terminal 141, and an IPTV terminal 142. For example, in downstream data transmission, the OLT 100 transmits packets to the ONT 120 through an interface 110 therebetween. The ONT 120 then splits the packets into three service categories: data packets, VoIP packets, and IPTV packets, and transmits the split packets correspondingly to the data communication, VoIP, and IPTV terminals 140 through 142 via their respective interfaces 130 through 132. In upstream data transmission, the data communication terminal 140, the VoIP terminal 141, and the IPTV terminal 142 generate packets and transmit the packets to the ONT 120 via their respective interfaces 130 through 132, and then the ONT 120 forwards the received packets to the OLT 100 via the interface 110 therebetween.

Figure 2:
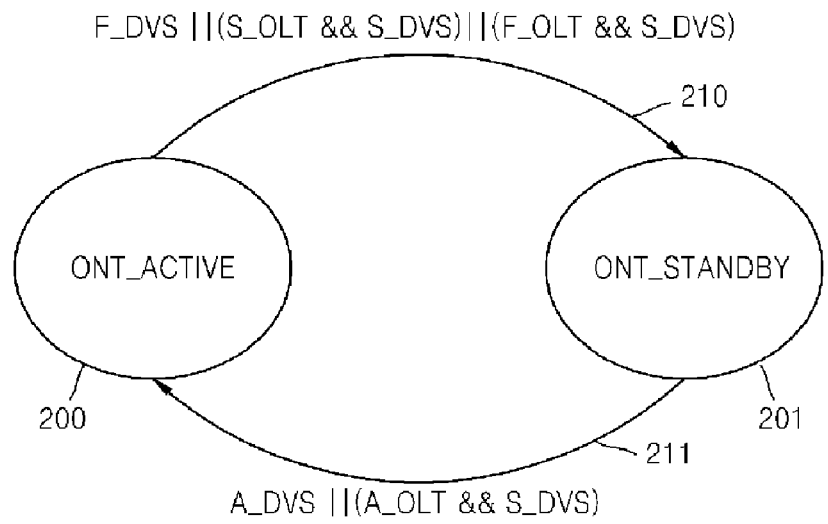
FIG. 2 is a diagram illustrating transition between modes of an ONT in a method of reducing power consumption for the ONT, according to an embodiment of the present invention.

FIG. 2 is a diagram illustrating transition between modes of an ONT in a method of reducing power consumption for the ONT, according to an embodiment of the present invention. Referring to FIGS. 1 and 2, initially, the ONT operates in an activation mode ONT_Active 200 in which the OLT 100 normally transmits/receives data to/from the data communication, VoIP, and IPTV terminals 140 through 142. To derive the requirements needed for the ONT to switch to power-saving mode ONT_Standby 201, the states of the OLT 100 and the data communication, VoIP, and IPTV terminals 140 through 142 with respect to the ONT are defined as follows:

Definition of the States of the OLT 100

(1) A_OLT (Active_OLT) represents a state in which the OLT 100 has packets to transmit to a user terminal connected to the ONT.

(2) S_OLT (Standby_OLT) represents a state in which the OLT 100 has no packets to transmit to a user terminal connected to the ONT.

(3) F_OLT (Failure_OLT) represents a state in which the OLT 100 cannot operate normally due to a failure of a link or device.

The ONT receives packets from the OLT 100 and checks the received packets so that the ONT recognizes the current state of the OLT 100. For example, if the received packets are destined for a user terminal connected to the ONT, the ONT may determine the current state of the OLT 100 as A_OLT. Conversely, if the received packets (including a broadcast message) are not destined for a user terminal connected to the ONT, the ONT will determine the current state of the OLT 100 as S_OLT. Unless receiving a periodic control message from the OLT 100, the ONT determines that there is a failure in a link to the OLT 100 and determines the current state of the OLT 100 as F_OLT.

Definition of the States of the Terminals Connected to the ONT (1) A_DVS (Active_Devices) represents a state in which at least one of the user terminals connected to an ONT is in an activation mode.

(2) S_DVS (Standby_Devices) represents a state in which at least one of the user terminals connected to the ONT is in a power-saving mode and the remaining user terminals malfunction or cease to operate.

(3) F_DVS (Failure_Devices) represents a state in which all the user terminals connected to the ONT do not operate normally.

The data communication, VoIP, and IPTV terminals 140 through 142 that are connected to an ONT can be categorized into terminals having a function to report their states to the ONT and terminals having no state reporting function. The data communication, VoIP, and IPTV terminals 140 through 142 can also be classified into terminals supporting a power-saving mode and terminals not supporting such mode. Terminals having a state reporting function report their current state to the ONT in response to a reporting request message from the ONT or upon the switching to another mode. The ONT determines the state of terminals having no state reporting function according to the status of a link and normal transmission/reception of a control packet. The ONT also determines that terminals not supporting a power-saving mode are in an activation mode if a link is in the normal state or the terminals normally exchange a message with the ONT.

Based on the state of the OLT 100 and the data communication, VoIP, and IPTV terminals 140 through 142 (as defined above), the following requirements are needed for the switching of the ONT to another mode:

Requirements for Switching from ONT_Active to ONT_Standby (210):
(1) F_DVS
(2) S_OLT & S_DVS
(3) F_OLT & S_DVS Upon the switching to an activation mode ONT_Active, the ONT turns off the power for all functions (transmitter, switch chip, etc) except for the power for monitoring and controlling the upstream/downstream interfaces 110 and 130 through 132. If the following requirements are met while the ONT is in a power-saving mode ONT_Standby, the ONT switches from power-saving mode ONT_Standby to activation mode ONT_Active and simultaneously applies power again so that all functions are performed normally.

Requirements for the Switching from ONT_Standby to ONT_Active (211):
(1) A_DVS
(2) A_OLT & S_DVS FIG. 3 is a flowchart illustrating a method of reducing power consumption for an ONT in an OAN, according to an embodiment of the present invention.

Figure 3:
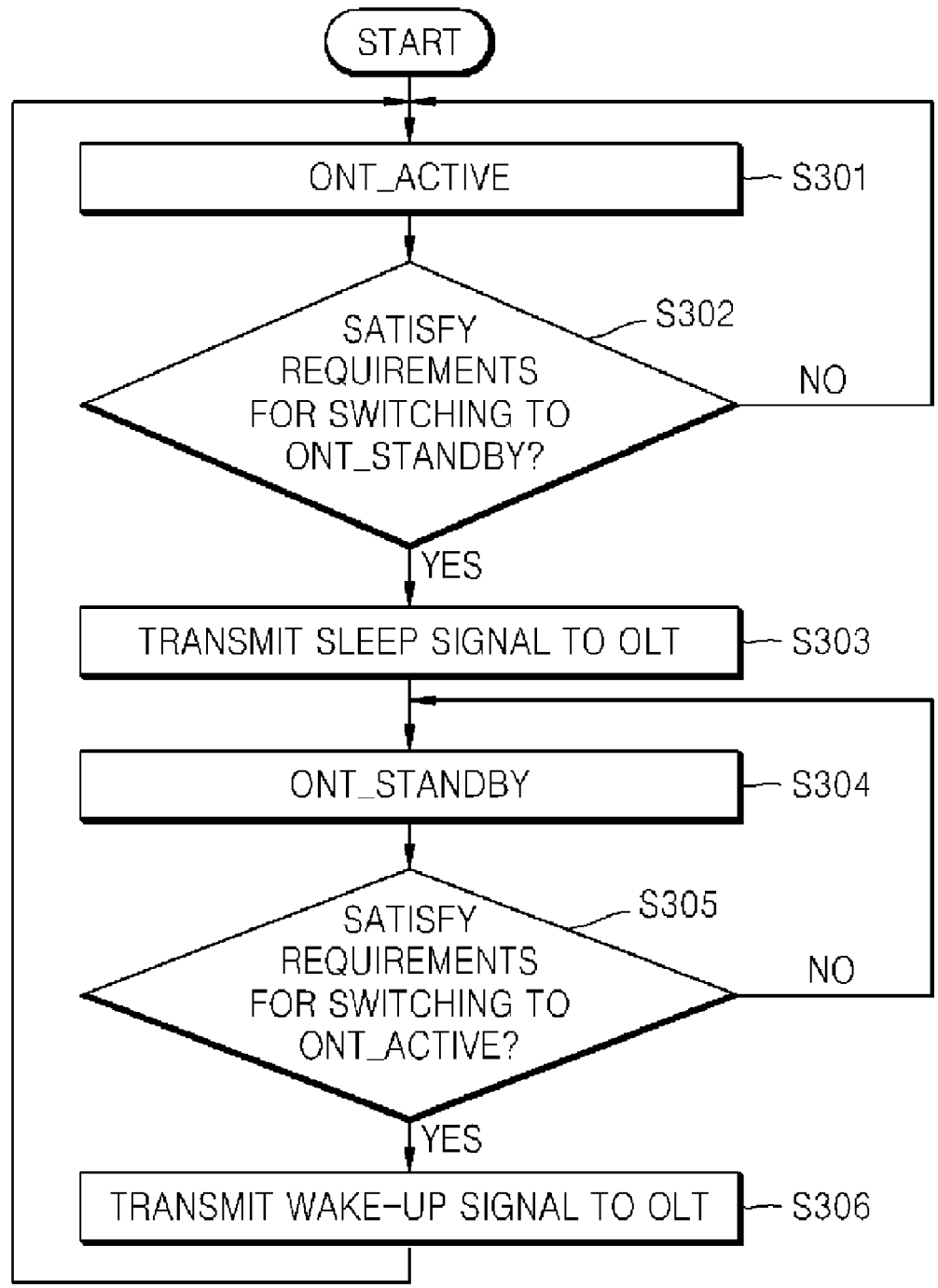
FIG. 3 is a flowchart illustrating a method of reducing power consumption for an ONT in the OAN, according to an embodiment of the present invention.

Referring to FIG. 3, upon application of power, the ONT operates normally in an activation mode (S301). The ONT then determines whether the requirements for switching from the activation mode to the power-saving mode (F_DVS, S_OLT & S_DVS, or F_OLT & S_DVS) are satisfied (S302).

If the requirements F_DVS, S_OLT & S_DVS, or F_OLT & S_DVS are satisfied in operation S302, the ONT transmits a sleep signal to the OLT 100 (S303). The sleep signal is a message that notifies the OLT 100 that the ONT will soon switch to power-saving mode. That is, by receiving the sleep signal, the OLT 100 can be notified of the current state of the ONT.

After transmitting the sleep signal to the OLT 100, the ONT switches to power-saving mode (S304). In the power-saving mode, the ONT cuts off power for all functions except for power for monitoring and controlling external inputs in order to minimize power consumption.

Thereafter, the ONT determines whether the requirements for switching from power-saving mode to activation mode (A_DVS or A_OLT & S_DVS) are satisfied (S305). If the requirements A_DVS or A_OLT & S_DVS are satisfied in operation S305, the ONT transmits a wake-up signal to the OLT 100 (S306) and returns to operation S301. That is, the ONT switches to activation mode for normal operation.

Figure 4:
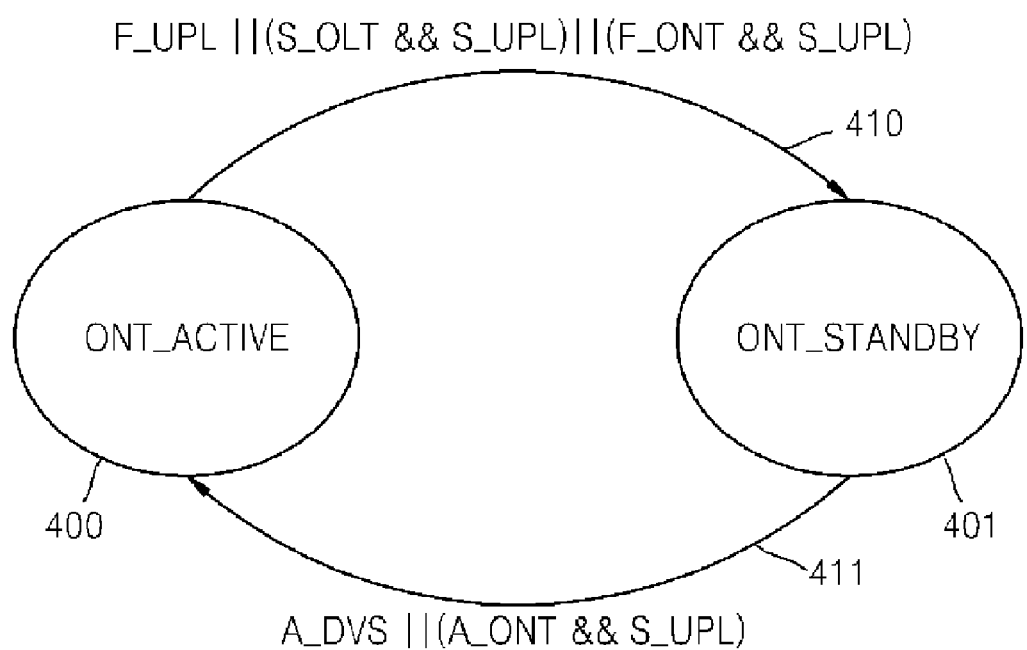
FIG. 4 is a diagram illustrating transition between modes of an OLT in a method of reducing power consumption for the OLT, according to an embodiment of the present invention.

FIG. 4 is a diagram illustrating transition between modes of the OLT 100 in a method of reducing power consumption for the OLT 100, according to an embodiment of the present invention. Referring to FIGS. 1 and 4, initially, the OLT 100 operates in an activation mode OLT_Active 400 in which the OLT 100 normally transmits/receives data to/from the data communication, VoIP, and IPTV terminals 140 through 142. To derive the requirements needed for the OLT 100 to switch to a power-saving mode OLT_Standby 401, the states of an ONT and an uplink 113 with respect to the OLT 100 are defined as follows:

Definition of the State of the ONT
(1) A_ONT (Active_ONTs) represents a state in which at least one of the ONTs connected to the OLT 100 is in an activation mode ONT_Active.
(2) S_ONT (Standby_ONTs) represents a state in which at least one of the ONTs connected to the OLT 100 is in a power-saving mode ONT_Standby and the remaining ONTs malfunction due to failures of equipment and link.
(3) F_ONT (Failure_ONTs) represents a state in which all the ONTs cannot operate normally due to a failure of a link or device.

By receiving a sleep signal and a wake-up signal from the ONTs, the OLT 100 can be notified of the current state of the ONTs. For example, if the OLT 100 receives sleep signals from all the ONTs, the OLT 100 may determine that the current state of the ONTs respectively as S_ONT. If the OLT 100 receives a wake-up signal from an ONT, which indicates that at least one ONT is in activation mode ONT_Active, the OLT 100 determines that the current state of the ONT as A_ONT. If all the ONTs connected to the OLT 100 do not operate normally due to a failure of a device or link, the OLT 100 determines the current state of the ONTs as F_ONT.

Definition of the State of Uplink
(1) A_UPL (Active_UpLink) represents a state in which an uplink has packets to transmit to an ONT connected to an OLT.
(2) S_UPL (Standby_UpLink) represents a state in which the uplink has no packets to transmit to the ONT connected to the OLT.
(3) F_UPL (Failure_UpLink) represents a state in which the uplink cannot operate normally due to a failure of a link or device.

Based on the state of the ONTs and uplink (as defined above), the following requirements are needed for the switching of the OLT to another mode:

Requirements for Switching from OLT_Active to OLT_Standby (410):
1) F_UPL
2) S_ONT & S_UPL
3) F_ONT & S_UPL Upon the switching to an activation mode OLT_Active, the OLT 100 turns off the power for all functions (transmitter, switch chip, etc) except for the power for monitoring and controlling the upstream/downstream interfaces 110 through 112. If the following requirements are met while the OLT 100 is in a power-saving mode OLT_Standby, the OLT 100 switches from power-saving mode OLT_Standby to activation mode OLT_Active and simultaneously applies power again so that all functions are performed normally.

Figure 5:
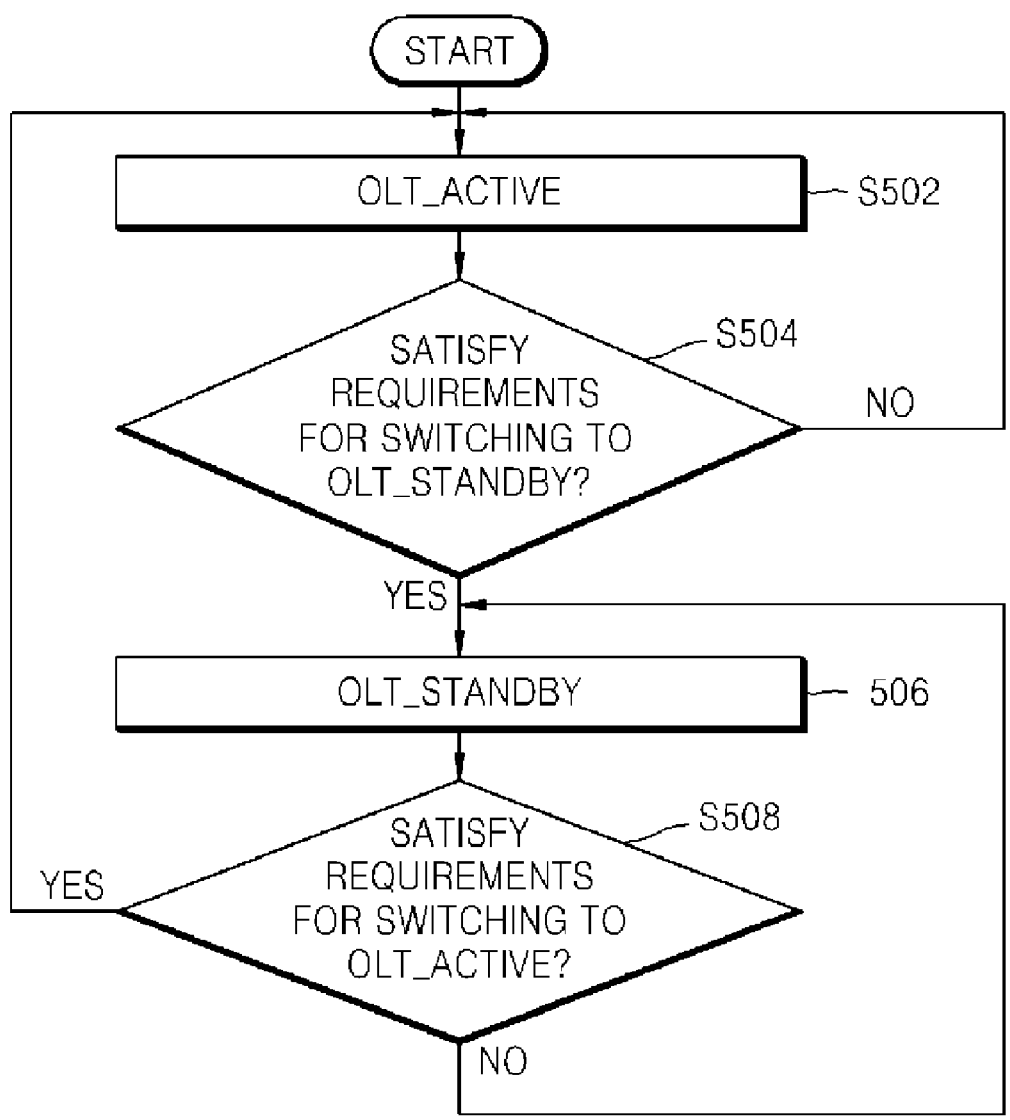
FIG. 5 is a flowchart illustrating a method of reducing power consumption for the OLT in an OAN, according to an embodiment of the present invention.

Requirements for Switching from OLT_Standby to OLT_Active (411):
1) A_UPL
2) A_ONT & S_UPL FIG. 5 is a flowchart illustrating a method of reducing power consumption for the OLT 100 in an OAN, according to an embodiment of the present invention. Referring to FIG. 5, upon the application of power, the OLT 100 operates normally in the activation mode (S502). The OLT 100 then determines whether the requirements for switching from activation mode to power-saving mode are satisfied (S504). That is, the OLT 100 determines whether an uplink or the ONTs are into a state F_UPL in which the uplink cannot operate normally due to failures, a state S_ONT & S_UPL in which at least one of the ONTs connected to the OLT 100 is in a power-saving mode and the remaining ONTs malfunction due to a failure of a link or device while the uplink has no packets to transmit to the ONT connected to the OLT 100, or a state F_ONT & S_UPL in which all the ONTs cannot operate normally due to a failure of a link or device while the uplink has no packets to transmit to the ONT connected to the OLT.

If the requirements F_UPL, S_ONT & S_UPL, or F_ONT & S_UPL are satisfied in operation S504, the OLT 100 switches to the power-saving mode and turns off the power for all functions except for the power for monitoring and controlling upstream/downstream interfaces (S506).

The OLT 100 determines whether the requirements for switching from power-saving mode to activation mode are satisfied (S508). More specifically, the OLT 100 determines whether an uplink or ONTs are into a state A_UPL in which the uplink has packets to transmit to the ONT connected to the OLT and a state S_ONT & S_UPL in which at least one of the ONTs connected to the OLT 100 is in a power-saving mode and the remaining ONTs malfunction due to failures of equipment and link while the uplink has no packets to transmit to the ONT connected to the OLT 100. If the requirements A_UPL or S_ONT & S_UPL are satisfied in operation S508, the OLT 100 returns to the operation S502.

The invention claimed is:

1. A method of reducing power consumption for an optical network terminal (ONT) in an optical access network (OAN), the method comprising:
    applying power so that the ONT operates normally in an activation mode;
    monitoring for a first state, a second state, and a third state;
    switching the ONT from the activation mode to a power-saving mode if one of the first, second, and third states is detected;
    transmitting, if any of the first, second, and third states are detected, a sleep signal, as a message notifying that the ONT will soon switch to the power-saving mode, from the ONT to an optical line terminal (OLT);
    switching the ONT to the power-saving mode and cutting off power for all functions of the ONT except for power for monitoring and controlling an external input;
    monitoring for a fourth state and a fifth state;
    switching from the power saving mode to the activation mode if one of the fourth and fifth states is detected; and
    transmitting, if the requirements for switching from the power-saving mode to the activation mode are satisfied, a wake-up signal from the ONT to the OLT and switching the ONT to the activation mode for normal operation;
    wherein the first state is a state in which all terminals connected to the ONT are in an abnormal operational state,
    the second state is a state in which the OLT has no packets to transmit to a terminal connected to the ONT while at least one of the terminals connected to the ONT is in a power-saving mode and the remaining terminals malfunction, and
    the third state is a state in which the OLT cannot operate normally due to a link failure while at least one of the terminals connected to the ONT is in the power-saving mode and the remaining terminals malfunction.

2. The method of claim 1, wherein the fourth state is a state in which the OLT or terminals connected to the ONT are in a state in which at least one of the terminals connected to the ONT is in an activation mode, and the fifth state is a state in which the OLT has packets to transmit to a terminal connected to the ONT while at least one of the terminals connected to the ONT is in the power-saving mode and the remaining terminals malfunction.

3. A method of reducing power consumption for an optical line terminal (OLT) in an optical access network (OAN), the method comprising:
    applying power so that the OLT operates normally in an activation mode;
    monitoring for a first state, a second state, and a third state;
    switching, if one of the first, second, and third states is detected, the OLT to the power-saving mode and turning off power for all functions except for power for monitoring and controlling upstream and downstream interfaces;
    monitoring for a fourth state and a fifth state;
    applying, if one of a fourth and fifth state is detected, the power from the OLT so that the OLT operates normally in the activation mode;
    wherein the first state is a state in which an uplink or optical network terminals (ONTs) connected to the OLT do not operate normally due to a failure,
    the second state is a state in which at least one of the ONTs connected to the OLT is in a power-saving mode and the remaining ONTs malfunction while the uplink has no packets to transmit to the ONT connected to the OLT, and
    the third state is a state in which all the ONTs cannot operate normally due to a failure while the uplink has no packets to transmit to the ONT connected to the OLT.

4. The method of claim 3, wherein the fourth state is a state in which an uplink or optical network terminals (ONTs) connected to the OLT are in a state in which the uplink has packets to transmit to the ONT connected to the OLT, and the fifth state is a state in which at least one of the ONTs connected to the OLT is in the power-saving mode and the remaining ONTs malfunction while the uplink has no packets to transmit to the ONT connected to the OLT.

* * * * *